US00RE40537E

(19) United States
(12) Reissued Patent
Gilmour

(10) Patent Number: US RE40,537 E
(45) Date of Reissued Patent: Oct. 14, 2008

(54) AUTOMOTIVE FUEL TANK ELECTRICAL FITTING

(75) Inventor: Daniel A. Gilmour, West Hartford, CT (US)

(73) Assignee: TI Group Automotive Systems, L.L.C., Warren, MI (US)

(21) Appl. No.: 11/119,498

(22) Filed: Apr. 29, 2005

Related U.S. Patent Documents

Reissue of:
(64) Patent No.: 6,555,754
Issued: Apr. 29, 2003
Appl. No.: 09/765,252
Filed: Jan. 18, 2001

(51) Int. Cl.
*H01B 17/26* (2006.01)

(52) U.S. Cl. ..... 174/151; 439/935; 439/559
(58) Field of Classification Search ..... 174/151, 174/152 GM; 439/587, 935, 559, 566
See application file for complete search history.

(56) References Cited

U.S. PATENT DOCUMENTS

| | | | | | |
|---|---|---|---|---|---|
| 3,780,204 | A | * | 12/1973 | Oliver et al. | 174/11 R |
| 3,825,669 | A | * | 7/1974 | Korner et al. | 174/11 R |
| 3,898,731 | A | * | 8/1975 | Ring et al. | 29/875 |
| 4,213,004 | A | * | 7/1980 | Acker et al. | 174/151 |
| 4,458,108 | A | * | 7/1984 | Kashimoto et al. | 174/152 R |
| 4,700,999 | A | * | 10/1987 | Probst | 439/271 |
| 4,822,294 | A | * | 4/1989 | McClearn | 439/274 |
| 4,921,437 | A | * | 5/1990 | Cooper et al. | 439/275 |
| 4,924,031 | A | * | 5/1990 | Arai | 174/152 R |
| 4,964,788 | A | * | 10/1990 | Itameri-Kinter et al. | 174/152 GM |
| 5,170,017 | A | * | 12/1992 | Stanevich et al. | 174/153 G |
| 5,266,051 | A | * | 11/1993 | Chupak | 439/273 |
| 5,290,191 | A | * | 3/1994 | Foreman et al. | 439/225 |
| 5,631,445 | A | * | 5/1997 | Herster | 174/151 |
| 5,669,763 | A | * | 9/1997 | Pryce et al. | 417/313 |
| 5,683,108 | A | * | 11/1997 | Blumenthal et al. | 280/737 |
| 5,768,083 | A | * | 6/1998 | Maki et al. | 361/120 |
| 5,861,577 | A | * | 1/1999 | Tamura et al. | 174/50.56 |
| 5,920,029 | A | * | 7/1999 | Teaford | 102/202.2 |
| 6,213,101 | B1 | * | 4/2001 | Numbers et al. | 123/516 |

FOREIGN PATENT DOCUMENTS

| | | |
|---|---|---|
| DE | 2036201 | 2/1971 |
| DE | 2309825 | 9/1973 |
| DE | 695 08 145 T2 | 10/1995 |
| DE | 692 13 274 T2 | 3/1997 |
| DE | 197 01 246 A1 | 7/1998 |
| DE | 299 18 994 U1 | 2/2000 |
| DE | 100 38 268 A1 | 2/2002 |
| JP | S58-147174 | 10/1983 |
| JP | X63-211577 | 9/1988 |
| JP | H02-309574 | 12/1990 |
| JP | H05-242922 | 9/1993 |
| JP | 2000-158957 | 6/2000 |

* cited by examiner

*Primary Examiner*—Jinhee Lee
(74) *Attorney, Agent, or Firm*—Reising, Ethington, Barnes, Kisselle, P.C.

(57) ABSTRACT

A glass-sealed electrical fitting for an automotive fuel tank is mounted on a flange which supports an internal fuel pump and fuel level sensor within the fuel tank. In one form, the glass seal surrounds a plurality of pins longitudinally disposed within an elongated housing which penetrates a fuel tank wall. An outer surface of the housing engages rigidly to the flange, and an inner surface of the housing engages to the glass seal. In another form each pin is sealed to a housing by a separate glass seal.

22 Claims, 4 Drawing Sheets

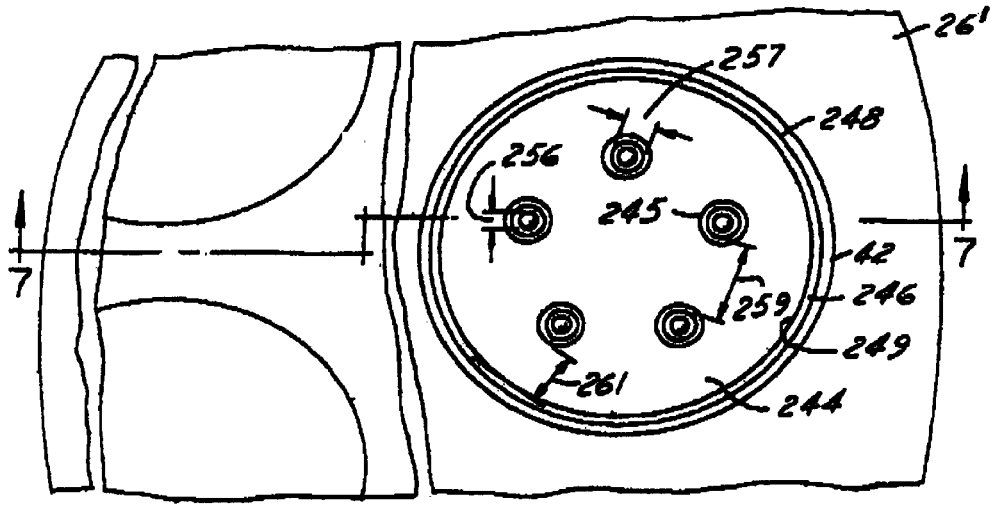
FIG. 6 (Amended)
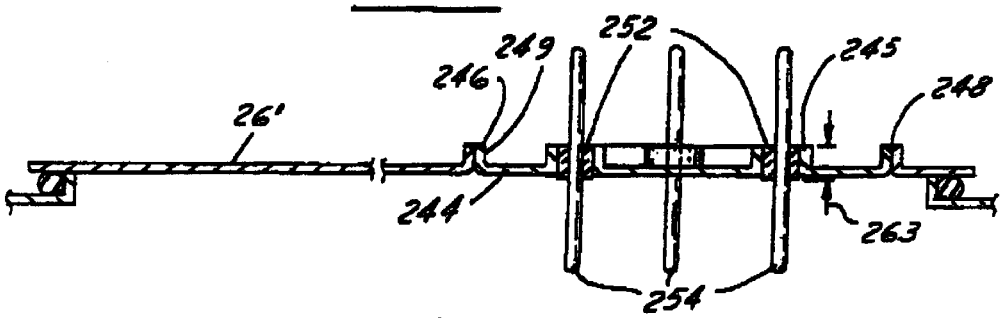
FIG. 7 (Amended)

AUTOMOTIVE FUEL TANK ELECTRICAL FITTING

Matter enclosed in heavy brackets [ ] appears in the original patent but forms no part of this reissue specification; matter printed in italics indicates the additions made by reissue.

FIELD OF THE INVENTION

The present invention relates to an automotive fuel tank electrical fitting, and more particularly to a glass-sealed electrical fitting for an automotive fuel tank.

BACKGROUND OF THE INVENTION

It is not unusual to mount fuel pumps inside a fuel tank for automotive vehicles. The fuel pump is typically part of a fuel dispensing unit which includes a fuel level sensor, a fuel filter and a structural member such as a flange mounted sealably to a fuel tank. During assembly, the fuel pump and level sensor are inserted through an opening in the fuel tank as one assembled unit, and the flange is engaged sealably to an exterior side of the fuel tank. An elastomeric O-ring provides the seal between the flange and the fuel tank. Electrical power typically routes to the internal devices within the fuel tank (pump and sensor) through an electrical fitting mounted to the flange.

Stringent government environmental regulations are persuading the automotive industry to make a closer study of fuel vapor permeation through a fuel tank. In many instances, the once popular, light weight, plastic fuel tank is being replaced with impermeable steel tanks. Aside from the walls of a plastic fuel tank, another source of permeation is through the electrical fitting which penetrates the flange. A multitude of wires electrically connect to the internal devices of the fuel tank; therefore, a corresponding multiple of terminal pins penetrate the flange. Each pin penetration is a potential source for vapor leakage. Existing electrical fittings do not provide a hermetic seal, but use rubberized seals or elastic grommets to minimize permeation. However, temperature variations and aging degrade the integrity of the seals, resulting in a loss of the permeation barrier.

SUMMARY OF THE INVENTION

Accordingly, the present invention is a glass-sealed electrical fitting for an automotive fuel tank. The fitting has a plurality of pins which penetrate a wall of the fuel tank and thereby provide the electrical connections for a fuel pump, fuel level sensor, etc. located inside the fuel tank. A glass seal hermetically engages the metallic surfaces of the pins and a metallic surface interconnected to the fuel tank wall. Preferably, the metallic surface interconnected to the fuel tank wall is an inner surface of a housing which surrounds and extends longitudinally of the pins. An outer surface of the housing engages an inner edge of a flange which mounts to a circumferential edge of the opening of the fuel tank.

Objects, features and advantages of the invention include the elimination of fuel vapor permeation through an electrical fitting of an automotive fuel tank, a permeation barrier capable of withstanding environmental temperature fluctuations and aging, and an electrical fitting which is rugged, durable, of economical manufacture and assembly and in service has a long useful life.

BRIEF DESCRIPTION OF THE DRAWINGS

These and other objects, features and advantages of the invention will be apparent from the following detailed description of the preferred embodiments and best modes, appended claims and accompanying drawings in which:

FIG. 6 is a top view of the second embodiment of the electrical fitting;

FIG. 7 is a cross-sectional view of the electrical fitting taken along line 7—7 of FIG. 6.

DETAILED DESCRIPTION OF THE PREFERRED EMBODIMENTS

Figure 1:
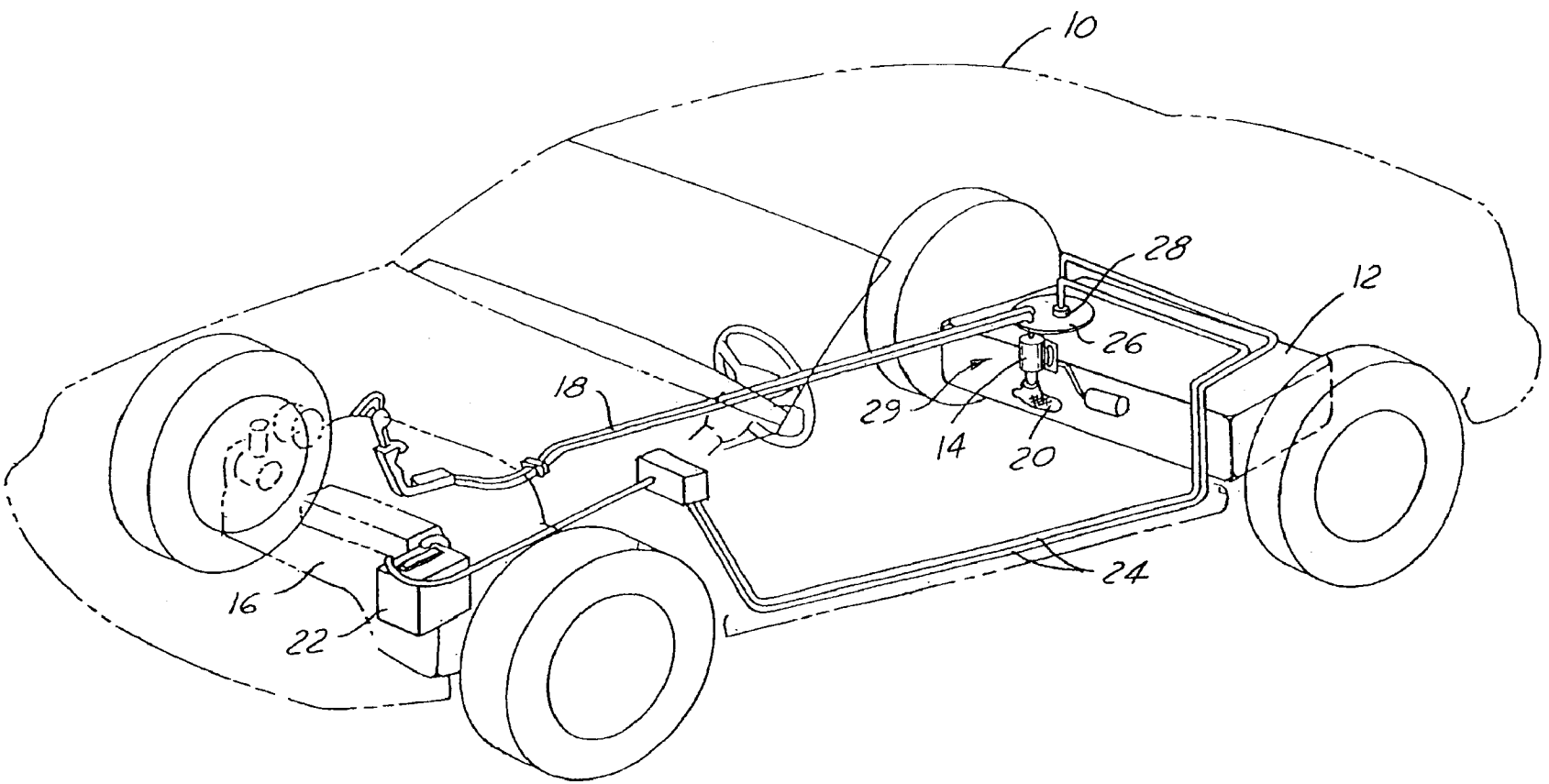
FIG. 1 is a perspective view of a vehicle with a fuel tank having an electrical fitting according to a preferred embodiment of the present invention.

Referring in more detail to the drawings, FIG. 1 shows a vehicle 10 having a fuel tank 12 mounted in the rear. An electric fuel pump 14 is mounted within the fuel tank 12 and delivers excess fuel to an engine 16 some of which returns to the tank via a pair of supply and return fuel lines 18. A battery 22 powers both the fuel pump 14 and a fuel level sensor 20 mounted inside the fuel tank 12. The electrical power is transferred via a plurality of electrical wires 24. The fuel lines 18 and the wires 24 commonly enter the fuel tank 12 through a fuel tank flange portion 26. The flange portion 26 commonly supports, usually in a suspended fashion, both the fuel pump 14 and the fuel level sensor 20. More specifically, the wires 24 electrically communicate through the flange portion 26 via an electrical fitting 28 of the present invention which is mounted on and penetrates through the flange portion 26. The fuel pump 14, the fuel level sensor 20, the flange portion 26 and the electrical fitting 28 preferably comprise a fuel sender module 29 which is manufactured separate from the fuel tank 12.

Figure 2:
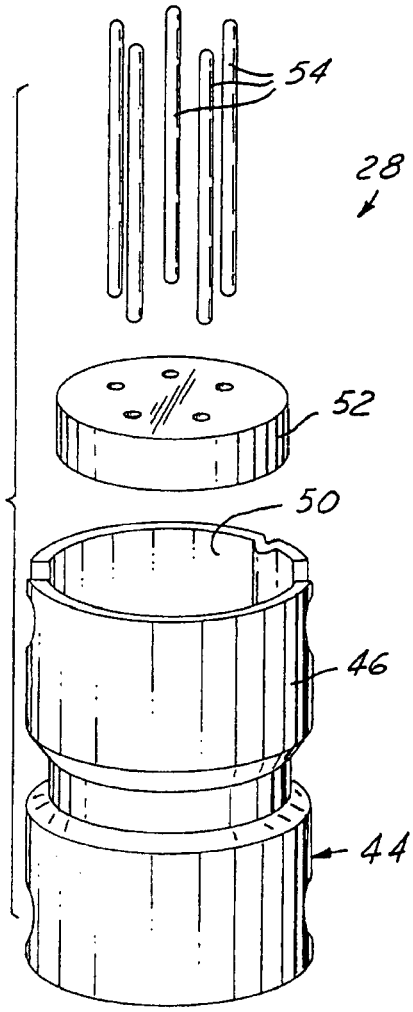
FIG. 2 is an exploded perspective view of the electrical fitting.
Figure 2:
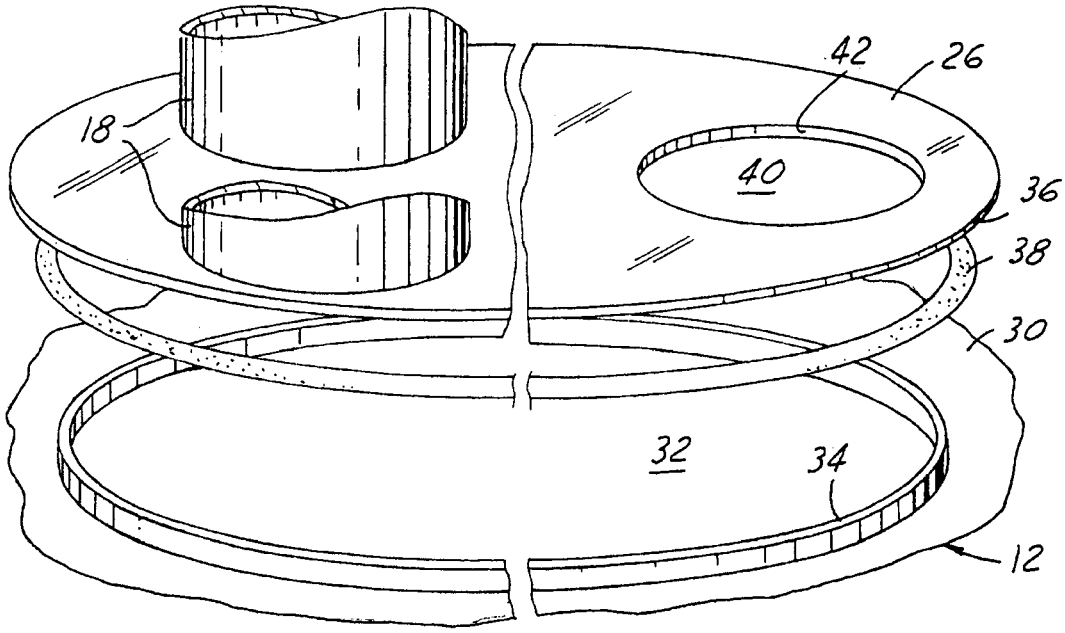

Referring to FIG. 2, the flange portion 26 becomes an integral part of a fuel tank wall 30 of the fuel tank 12 after fitting the fuel sender module 29 to the fuel tank 12. A substantial portion of the fuel sender module 29 inserts through an opening 32 of the fuel tank wall 30 which is defined by a circumferential edge 34. Engaging the circumferential edge 34, or an outward surface of the tank wall 30 about edge 34, is a peripheral edge or lip 36 of the flange portion 26. An o-ring 38 is compressed sealably between the flange portion 26 and the fuel tank wall 30 providing a vapor proof seal or barrier. Any variety of vapor barriers other than an o-ring may also be applied, including gaskets and sealants. Furthermore, the flange portion 26 can be a unitary part of the fuel tank wall 30 thereby alleviating the need for a vapor seal altogether. However, if the flange portion 26 is unitary to the fuel tank wall 30, the fuel sender module 29 is no longer manufactured separately from the fuel tank 12.

The flange portion 26 is penetrated by the pair of fuel lines 18 and the electrical fitting 28. The electrical fitting 28 transverses through a hole 40 of the flange portion 26. The hole 40 is defined by an inner edge 42. A tubular housing 44 of the electrical fitting 28 has an outer surface 46 which engages the inner edge 42 of the flange 26. Housing 44 is substantially perpendicular to the flange 26. The outer surface 46 and the inner edge 42 of the flange portion 26 form a seam 48, shown in FIG. 4. The seam 48 is preferably a brazed, soldered, or welded joint preventing vapor permeation through the seam. The housing 44 and the flange portion 26 are metallic, preferably stainless steel or steel.

A plurality of elongated pins 54 are preferably circumferentially spaced apart and parallel to the axis of the housing 44 and extend longitudinally within the elongated housing 44. A glass seal 52, when in a molten state, is formed about the pins 54 inside the housing 44. The pins 54 are substantially perpendicular to the glass seal 52. When solidified, the glass seal 52 is in a compressed state and prevents fuel vapor permeation through the electrical fitting 28 by engaging a metallic inner surface 50 of the housing 44 and a metallic surface of the pins 54. The solidification of the glass to the metallic surfaces also provides a chemical bond. For the glass seal 52 to achieve or maintain a compressive state, the thermal expansion rate of the flange portion 26 and the tubular housing 44 is greater than the thermal expansion rate of the glass seal 52. Because the plurality of pins 54 electrically engage the respective plurality of wires 24, the seal requires electrical insulating properties which the glass seal 52 provides. Furthermore, the glass material must be capable of resisting thermal transients without breaking the bond to either the housing 44 or the pins 54. Preferable glass materials are barium alkali, borosilicate or soda lime.

Figure 3:
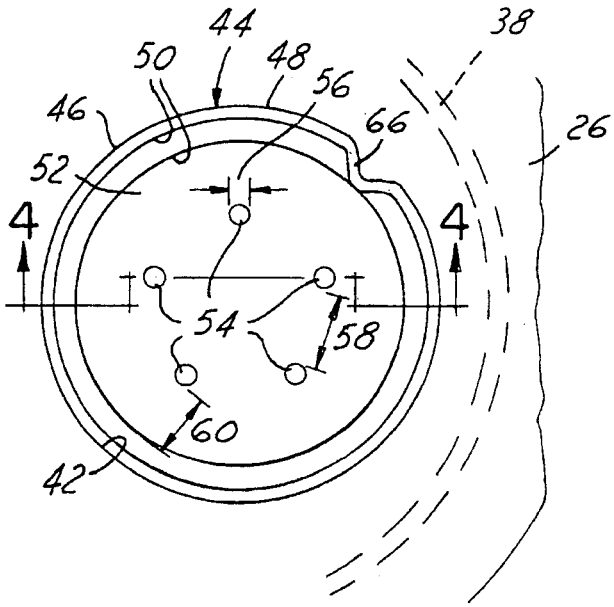
FIG. 3 is a top view of the electrical fitting.
Figure 4:
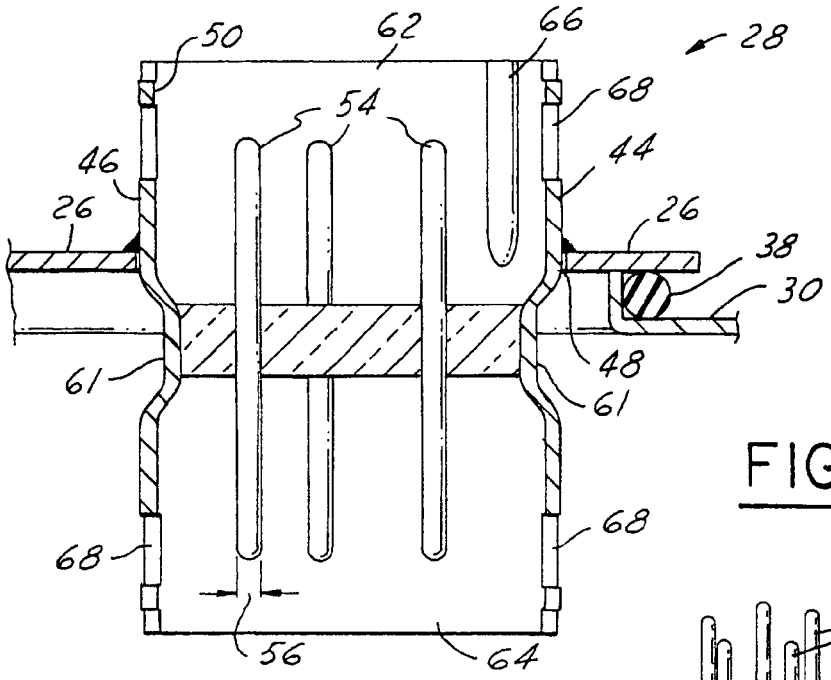
FIG. 4 is a cross sectional view of the electrical fitting taken along line 4—4 of FIG. 3.

Referring to FIGS. 3 and 4 the transverse separation of the pins 54 from one another and the separation of the pins 54 from the housing 44 will have an impact on the exposure of the electrical fitting 28 to thermal stresses during temperature fluctuations. To ensure vapor barrier integrity is not breached as a result of thermal stress, the diameter 56 of each pin 54 is preferably equal to or less than the transverse distance or separation 58 between adjacent pins. Furthermore, a perimeter-edge-to-pin transverse minimum distance 60, measured generally from the inner surface 50 of the housing to the pin 54 surface, is preferably equal to or greater than the diameter 56 of the pin 54. To minimize the amount of glass material required and to provide easy external connector or plug locking capability to the housing 44, the housing 44 preferably has a circumferential recess 61 which protrudes radially inward and aligns axially with the glass seal 52.

The housing 44 has an outward or top portion 62 disposed above the glass seal 52 and an inward or bottom portion 64 disposed below the glass seal 52. The outward portion 62 has an axially extending elongated nubbin 66 which mates with a terminal plug end of the electrical wires 24 (not shown). Nubbin 66 assures that the pins 54 are not damaged by improper insertion of the terminal plug. The plug engages the plurality of pins 54 and preferably snaps in place via a plurality of orifices or holes 68 which penetrate the outward and inward portions 62, 64 of the housing 44 on either axial side of the recess 61. A similar plug engages the inward portion 64 of the housing 44 to electrically connect the fuel pump 14 and fuel level sensor 20.

The plurality of pins 54 commonly comprise four to five pins. The first pin is a hot lead for the fuel pump 14 and a second pin is the ground. A third pin provides the hot lead for the fuel sensor 20 and a fourth pin provides the ground. If the fuel pump 14 is of a variable speed type, a fifth pin is needed. Essentially, the electrical fitting 28 may contain any number of pins 54 depending upon the electrical devices and required electrical loads contained within the fuel tank 12.

Figure 5:
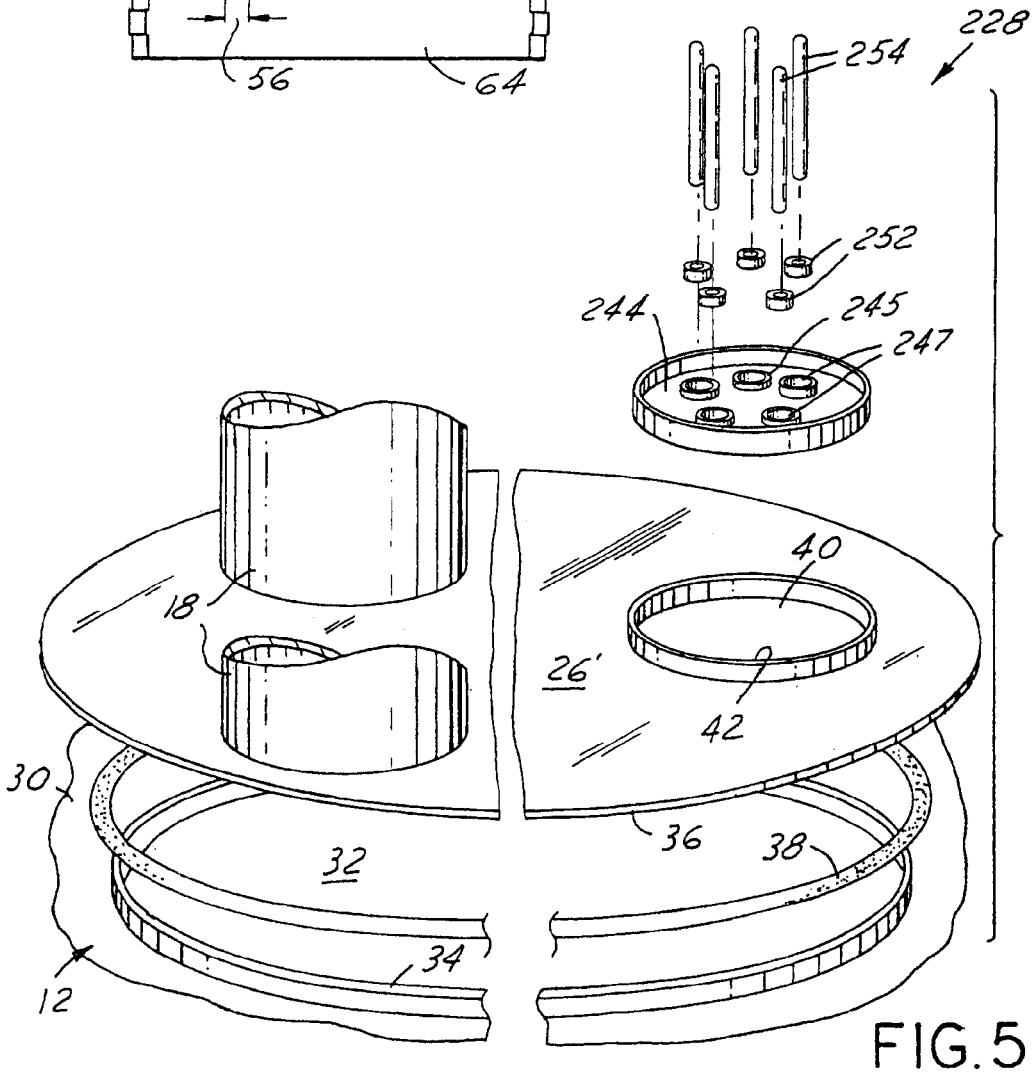
FIG. 5 is an exploded perspective view of a second embodiment of the electrical fitting.

FIGS. 5–7 illustrate a second embodiment of the present invention with a separate glass seal 252 of each pin. Each one of the plurality of pins 254 correspond to and penetrate each respective one of the plurality of glass seals 252. An aperture plate or tray 244 has a plurality of collars 245, each defining an aperture 247 for a glass seal 252 which engages and seals between its associated collar 245 and pin 254. The tray 244 has a shoulder or rise 249 with a peripheral edge 246 similar to the outer surface 46 of the housing 44. The peripheral edge 246 and the inner edge 42 of the flange portion 26' form a seam 248. As in the first embodiment, seam 248 is formed and sealed by welding, soldering or brazing. Preferably, the collars 245 extend outward or upward from the fuel tank 12. The shoulder 249 is disposed about and extends outward along the periphery of tray 244. Preferably, the shoulder 249 terminates at the peripheral edge 246.

Referring to FIGS. 6 and 7, the spacing of the pins 254, seals 252, and tray 244 are relevant to prevent stress cracking within the seal 252 or bond separation from the pins 254 or the collars 245. The outer diameter 257 of each seal 252 preferably is substantially at least two and one half times greater than the diameter 256 of the pin. The transverse separation 259 between adjacent collars preferably is substantially at least as great as the seal outer diameter 257. The transverse minimum distance 261 between the inner surface of the shoulder 249 and each collar 245 preferably is substantially at least as large as the outside diameter 257 of the seal. Each seal 252 has an axial length 263 which is preferably substantially equal to the seal outer diameter 257.

Figure 8:
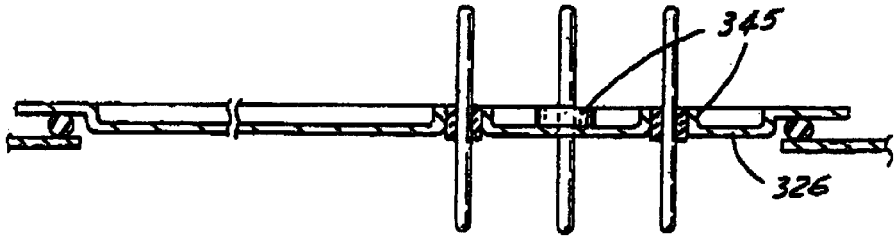
FIG. 8 is a cross-sectional view of a third embodiment of the electrical fitting.

FIG. 8 illustrates a third embodiment of the present invention which is similar to the second embodiment except that the tray 244 is omitted and the plurality of collars 345 of the third embodiment are formed directly in the flange 326. Therefore, the flange 326 no longer contains the hole 40 of the flange 26 or the inner edge 42 of the flange 26' of the first and second embodiments.

While the forms of the invention herein disclosed constitute presently preferred embodiments, many others are possible. It is not intended herein to mention all the possible embodiments of the invention which will be apparent to those skilled in the art. It is understood that the terms used herein are merely descriptive rather than limiting, in that various changes may be made without departing from the spirit or scope of this invention as defined by the following claims.

I claim:

1. A sealed electrical fitting for a vehicle fuel tank comprising:

a metal wall of the fuel tank having at least one opening through the wall with a circumferentially continuous edge;

at least two elongate electrically conductive metal pins extending through the at least one opening and each of the pins having a diameter and a longitudinal length greater than the diameter;

at least one seal of glass received in the at least one opening and bonded to at least one of the pins;

adjacent surfaces of adjacent pins being spaced apart a distance equal to or greater than the diameter of the pin, the minimum spacing between a peripheral edge of the glass seal and each immediately adjacent pin being at least equal to the diameter of the pin, the coefficient of thermal expansion of the metal wall being greater than the coefficient of thermal expansion of the glass of the glass seal, the metal wall and the glass seal being configured so that the glass is in a compressed state, and the same glass seal is bonded to at least two of the pins and the edge of the same opening through the metal wall.

2. The electrical fitting of claim 1 wherein the circumferentially continuous edge of the opening has an axial length at least equal to the diameter of the pin and the glass seal has an axial length at least equal to the diameter of the pin.

3. A sealed electrical fitting for a vehicle fuel tank comprising:

a metal wall of the fuel tank having a metal flange, a metal tubular housing fixed to the flange, extending through the flange, and defining an opening through the wall;

at least two elongate electrically conductive metal pins extending through the opening and each of the pins having a diameter and a longitudinal length greater than the diameter;

a seal of glass received in the opening and bonded to the pins;

adjacent surfaces of adjacent pins being spaced apart a distance equal to or greater than the diameter of the pin, the minimum spacing between a peripheral edge of the glass seal and each immediately adjacent pin being at least equal to the diameter of the pin, the coefficient of thermal expansion of the metal wall being greater than the coefficient of thermal expansion of the glass of the glass seal, the metal wall and the glass seal being configured so that the glass is in a compressed state; and all of the pins are received in the housing and the glass seal is bonded to all of the pins and the housing.

4. The electrical fitting of claim 3 wherein the axial length of the glass seal is substantially equal to the diameter of the pin.

5. The electrical fitting of claim 3 wherein a circumferential edge of the opening has an axial length at least equal to the diameter of the pin and the glass seal has an axial length at least equal to the diameter of the pin.

6. A sealed electrical fitting for a vehicle fuel tank comprising:

a metal wall of the fuel tank having a metal flange, at least two metal collars carried by the flange and each defining a through opening having an inner circumferentially continuous edge;

an electrically conductive metal pin extending through each of the openings and each of the pins having a diameter and a longitudinal length greater than the diameter;

a seal of glass received in each of the openings and bonded to the associated pin received therein and the inner edge of the collar in which the pin is received; and adjacent surfaces of adjacent pins being spaced apart a distance equal to or greater than the diameter of the pin, the minimum spacing between a peripheral edge of the glass seal and each immediately adjacent pin being at least equal to the diameter of the pin, the coefficient of thermal expansion of the metal wall being greater than the coefficient of thermal expansion of the glass of the glass seal, and the metal wall and the glass seal being configured so that the glass of each seal is in a compressed state.

7. The electrical fitting of claim 6 wherein the inner edge of each collar has an axial length at least equal to the diameter of the pin received therein and the axial length of the seal received in the collar is at least equal to the diameter of its associated pin.

8. The electrical fitting of claim 6 wherein the collars are homogeneously integral with the flange.

9. The electrical fitting of claim 6 wherein the wall also comprises a metal tray having a circumferentially continuous outer peripheral edge, the collars are homogeneously integral with the tray, the flange has another through opening defined by a circumferentially continuous edge which bears on the outer peripheral edge of the tray and these mating edges are fixed and sealed together by one of welding, soldering and brazing.

10. The electrical fitting of claim 6 wherein each seal is an annular ring with an outside diameter of at least two and one-half times the diameter of its associated pin.

11. The electrical fitting of claim 10 wherein the spacing between immediately adjacent seals is at least equal to the outside diameter of the pins.

*12. A sealed electrical fitting for a vehicle fuel tank, comprising:*

*a metal body having at least one opening;*

*at least two elongate electrically conductive metal pins extending through the at least one opening and each of the pins having a diameter and a longitudinal length greater than the diameter;*

*at least one seal of glass received in the at least one opening and bonded to at least one of the pins;*

*adjacent surfaces of adjacent pins being spaced apart a distance equal to or greater than the diameter of the pin, the minimum spacing between a peripheral edge of the glass seal and each immediately adjacent pin being at least equal to the diameter of the pin, the coefficient of thermal expansion of the metal body being greater than the coefficient of thermal expansion of the glass of the glass seal, the metal body and the glass seal being configured so that the glass is in a compressed state, and*

*the same glass seal is bonded to at least two of the pins and the edge of the same opening through the metal body.*

*13. The electrical fitting of claim 12 wherein the circumferentially continuous edge of the opening has an axial length at least equal to the diameter of the pin and the glass seal has an axial length at least equal to the diameter of the pin.*

*14. A sealed electrical fitting for a vehicle fuel tank, comprising:*

*a metal flange, a metal tubular housing fixed to the flange, extending through the flange, and defining an opening;*

*at least two elongate electrically conductive metal pins extending through the opening and each of the pins having a diameter and a longitudinal length greater than the diameter;*

*a seal of glass received in the opening and bonded to the pins;*

*adjacent surfaces of adjacent pins being spaced apart a distance equal to or greater than the diameter of the pin, the minimum spacing between a peripheral edge of the glass seal and each immediately adjacent pin being at least equal to the diameter of the pin, the coefficient of thermal expansion of the housing being greater than the coefficient of thermal expansion of the glass of the glass seal, the housing and the glass seal being configured so that the glass is in a compressed state; and*

*all of the pins are received in the housing and the glass seal is bonded to all of the pins and the housing.*

*15. The electrical fitting of claim 14 wherein the axial length of the glass seal is substantially equal to the diameter of the pin.*

*16. The electrical fitting of claim 14 wherein a circumferential edge of the opening has an axial length at least equal to the diameter of the pin and the glass seal has an axial length at least equal to the diameter of the pin.*

*17. A sealed electrical fitting for a vehicle fuel tank, comprising:*

*a metal flange, at least two metal collars carried by the flange and each defining a through opening having an inner circumferentially continuous edge;*

*an electrically conductive metal pin extending through each of the openings and each of the pins having a diameter and a longitudinal length greater than the diameter;*

*a seal of glass received in each of the openings and bonded to the associated pin received therein and the inner edge of the collar in which the pin is received; and*

*adjacent surfaces of adjacent pins being spaced apart a distance equal to or greater than the diameter of the pin, the minimum spacing between a peripheral edge of the glass seal and each immediately adjacent pin being at least equal to the diameter of the pin, the coefficient of thermal expansion of the metal collars being greater than the coefficient of thermal expansion of the glass of the glass seal, and the metal collars and the glass seal being configured so that the glass of each seal is in a compressed state.*

*18. The electrical fitting of claim 17 wherein the inner edge of each collar has an axial length at least equal to the diameter of the pin received therein and the axial length of the seal received in the collar is at least equal to the diameter of its associated pin.*

*19. The electrical fitting of claim 17 wherein the collars are homogeneously integral with the flange.*

*20. The electrical fitting of claim 17 which also comprises a metal tray having a circumferentially continuous outer peripheral edge, the collars are homogeneously integral with the tray, and the flange has a through opening defined by a circumferentially continuous edge which bears on the outer peripheral edge of the tray and these mating edges are fixed and sealed together by one of welding, soldering and brazing.*

*21. The electrical fitting of claim 17 wherein each seal is an annular ring with an outside diameter of at least two and one-half times the diameter of its associated pin.*

*22. The electrical fitting of claim 21 wherein the spacing between immediately adjacent seals is at least equal to the outside diameter of the pins.*

* * * * *